May 15, 1945.  F. MAUD ET AL  2,376,161
TOOTH GEARING
Filed Jan. 17, 1944   2 Sheets-Sheet 1

INVENTORS
FRED MAUD AND
SAMUEL I. FAUNCE
BY John E. Hubbell
ATTORNEY

May 15, 1945.  F. MAUD ET AL  2,376,161
TOOTH GEARING
Filed Jan. 17, 1944  2 Sheets-Sheet 2

INVENTORS
FRED MAUD AND
SAMUEL T. FAUNCE
BY John E. Hubbell
ATTORNEY

Patented May 15, 1945

2,376,161

UNITED STATES PATENT OFFICE 2,376,161

TOOTH GEARING

Fred Maud and Samuel I. Faunce, Philadelphia, Pa., assignors to Selas Corporation of America, a corporation of Pennsylvania Application January 17, 1944, Serial No. 518,494

10 Claims. (Cl. 74—422)

The present invention relates to toothed gearing of the type in which two gears are relatively movable to bring their teeth into engagement, and the general object of the invention is to provide improved means for moving the teeth of the two gears into proper mesh, when said teeth are brought into engagement.

A more specific object of the invention is to provide simple and effective means for angularly adjusting a toothed gear about its own axis as is required to properly mesh its teeth with the teeth of a rack bar when the toothed gear is moved relative to the rack bar in the general longitudinal direction of the latter to effect engagement of the teeth of the toothed gear with the teeth of the rack bar.

The various features of novelty which characterize our invention are pointed out with particularity in the claims annexed to and forming a part of this specification. For a better understanding of the invention, however, its advantages, and specific objects attained by its use, reference should be had to the accompanying drawings and descriptive matter in which we have illustrated and described preferred embodiments of the invention.

Figure 1:
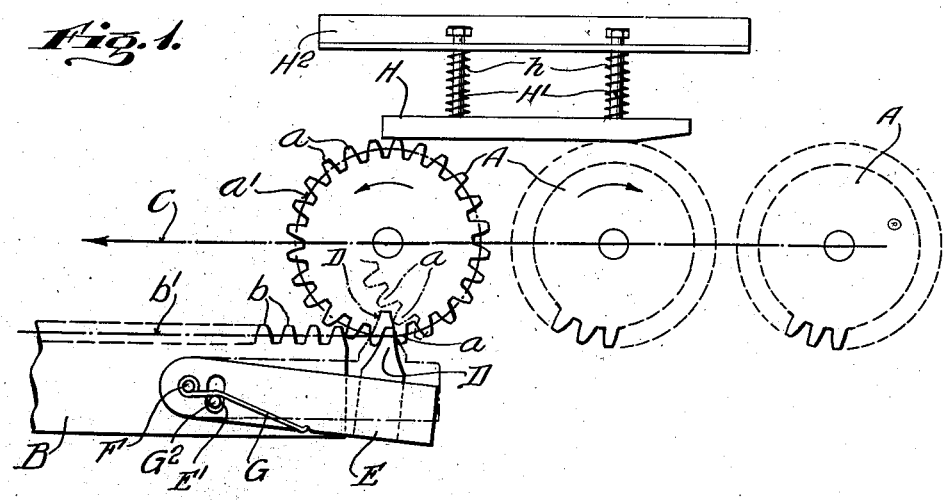
Fig. 1 is a somewhat diagrammatic plan view illustrating an embodiment of the invention.

The embodiment of the invention is shown somewhat diagrammatically in Fig. 1 as applied to a train of similar spur gears A which is moved relative to a rack bar B along a path transverse to the axes of the gears A and comprising a portion alongside and parallel to the rack bar. In the drawings, C represents the center line of said path along which the axes of the gears A move. The portion of the line C alongside the rack bar B is displaced from the pitch line $b'$ of the rack bar teeth $b$ by a distance approximately equal to the radius of the pitch circle $a'$ of the teeth $a$ of each gear A.

In accordance with the present invention, an index or intercepting tooth D is mounted for movement transversely of the pitch line $b'$ toward and away from the line C, along a path displaced longitudinally of the rack bar B, in front of the end tooth $b$ of the latter which comes first into meshing engagement with the teeth $a$ of an approaching gear A. As shown in Fig. 1, the tooth D is carried by an arm E pivoted to turn about a pivot F having one end anchored in the rack bar B and located sufficiently far from the tooth D and sufficiently close to the pitch line $b'$ so that the operative movement of the front end of the tooth D is approximately perpendicular to the pitch line $b'$.

A spring G biases the tooth D for movement into a position, shown in dotted lines in Fig. 1, in which its front end extends into the path of a peripheral portion of an approaching gear A. As shown in Fig. 1, the spring G has one end anchored by the pivot F, and has its other end in engagement with the arm E adjacent the tooth carrying end of the latter, and is engaged intermediate its ends by a pin $G^2$ anchored in the rack bar B and extending through a slot E' in the arm E. The movement of the tooth D toward the line C is limited, and the dotted line position of the tooth is fixed by the engagement of an end wall of the slot E' with the pin $G^2$.

With the tooth D in its dotted line position, the movement of the approaching spur gear A causes the tooth D to enter, or be received, in the space between two adjacent teeth $a$ of said gear. The tooth D remains in the tooth space in which it is thus entered until other teeth of said spur gear are brought into mesh with the rack bar teeth. While a spur gear A is thus engaged by the tooth D, and before said gear is moved into mesh with the rack bar B, the tooth D causes said spur gear to rotate about its own axis in the same direction in which it is rotated by the rack bar teeth $b$ when in mesh with the latter. During the period in which the tooth D is in engagement with the spur gear A, and as a result of the rotative movement of said gear, the front end of the tooth D is first moved away from the line C against the action of the spring G and is then moved by said spring back toward the line C. After the rotation and advancing movement of a spur gear A has brought the latter into mesh with the rack bar B, the continued movement of said gear moves the tooth space previously receiving the tooth D away from the latter. This leaves the tooth D in its dotted line position so that it may engage the next approaching gear A.

In the arrangement shown in Fig. 1, the tooth D is so displaced from the adjacent end tooth $b$ of the rack bar B that the tooth space of a gear A receiving said end tooth $b$ is separated from the tooth space receiving the tooth D by one intervening tooth space of the gear A. Such separation of the tooth spaces of a gear A respectively receiving the tooth D and the adjacent end tooth $b$ of the rack bar B is not essential, but we consider it advantageous when the spur gears A have not more than thirty or forty teeth each, and when the number of teeth on each gear A is larger the tooth spaces respectively receiving the index tooth D and adjacent end rack bar tooth $b$ may well be separated by two or more tooth spaces of the gear A. Advantageously and as shown, in the dotted line position of the tooth D shown in Fig. 1, the front end of the tooth is nearer the line C than are the front ends of the rack bar teeth $b$.

If the approaching spur gear A is not rotating when the index tooth D is first engaged by one of the spur gear teeth $a$, such engagement may result in an objectionable impingement of a corner of one of the engaging teeth against the end surface of the other of the engaged teeth. To avoid this, we advantageously provide means for rotating each spur gear A, during the period in which it initially engages the index tooth D. In the construction shown this rotation is effected by means of a bar or plate H located at the opposite side of the path C from the rack bar and operating to impress a frictional drag on each gear A as it approaches the rack bar B. The effect of said drag on a gear A, is to rotate the gear about its own axis in the direction of the arrow applied to the middle one of the three gears A shown in Fig. 1. In Fig. 1 the bar H is pressed into yielding engagement with the peripheral edges of two adjacent advancing gears A, by springs $h$. The latter surround transverse headed guide pins H' carried by the bar H and extending through openings or guideways formed in a supporting member $H^2$. The springs $h$ act between the member H and the support $H^2$.

As a result of its frictional engagement with bar H, each gear A is in rotation when it comes into engagement with the index tooth D and the latter is quickly entered in the proper tooth space of the gear A, even though the initial engagement brings a corner edge of one of the engaging teeth into engagement with the end surface of the other engaging tooth. As soon as the tooth D is entered in a tooth space of the gear A, and engages the wall of that space, it starts the gear A into the reverse rotation indicated by the arrow, applied in Fig. 1 to the gear A in engagement with the tooth D. When entered in said tooth space, the index tooth D serves as a fulcrum which does not share the advancing movement of the axis of the gear A, and about which the gear A turns to bring its teeth into mesh with the rack bar teeth.

As those skilled in the art will understand, the invention may advantageously be used in apparatus of varying types and employed for various purposes. By way of example, we have illustrated in Figs. 2–6, the use of the invention in a continuous furnace which comprises a horizontally elongated furnace chamber I in the form of a slot formed in the furnace masonry and open at its lower edge and at its ends. Work pieces or bodies to be annealed or otherwise treated in the furnace chamber I, are moved through the latter by a link belt conveyor J. As shown, alternate links J' of the conveyor J form seats for rotatable spindles K extending transversely to the conveyor away from the latter. Each spindle K is journalled on a pivot K' anchored at one end in the corresponding conveyor link J'. At its opposite or free end, the spindle K is formed with work centering and holding fingers $K^2$ for the detachable connection to the spindle of a work piece (not shown), to be moved through the furnace chamber I and to be rotated while in the furnace chamber. As shown, each spindle K includes adjacent its conveyor end, a gear AA. The latter may be, and as shown is generally like the gears A of Fig. 1 and is coaxial with the pivot K' of the spindle.

Figure 2:
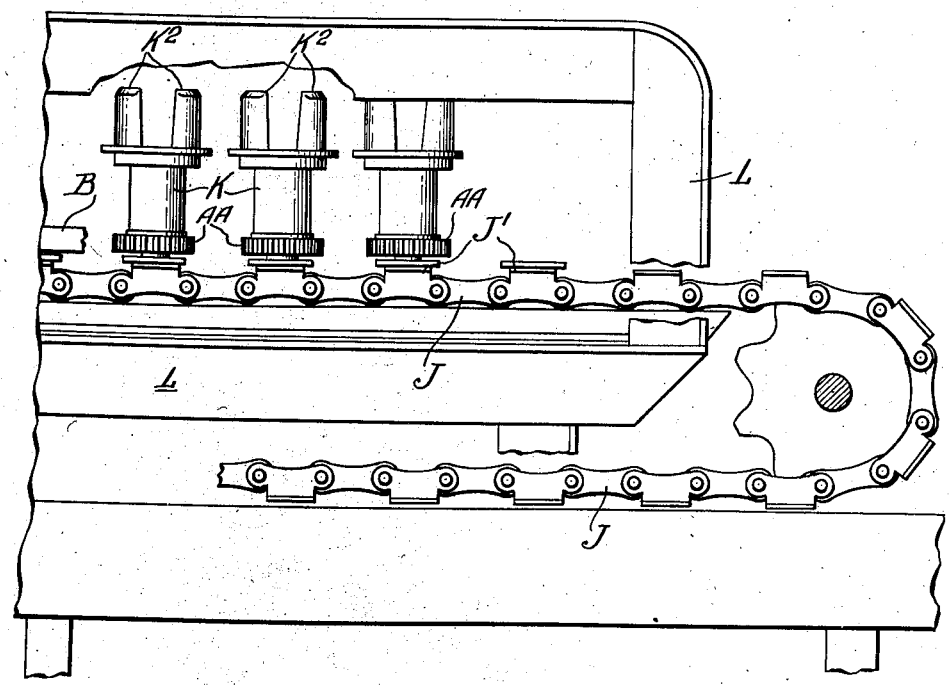
Fig. 2 is an elevation of a portion of a furnace including an embodiment of the present invention.
Figure 3:
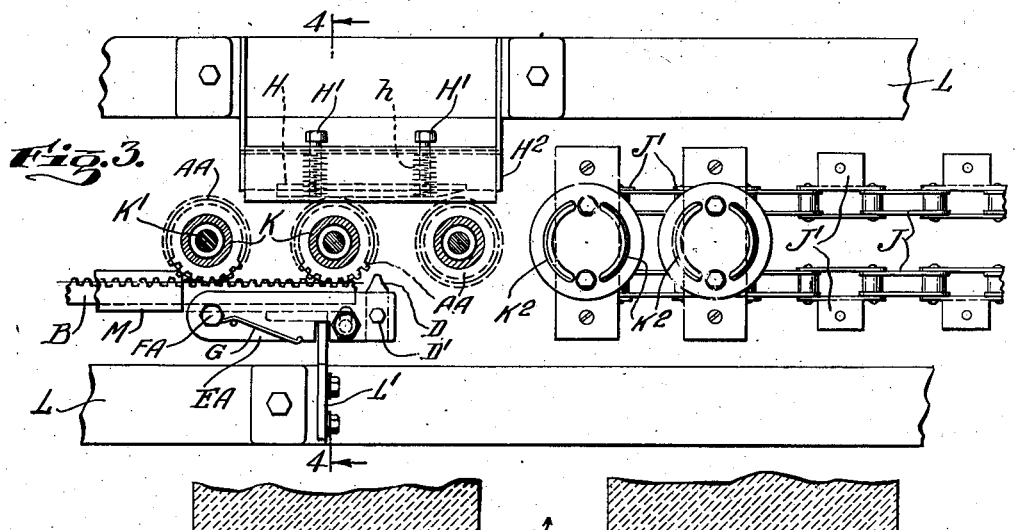
Fig. 3 is a partial plan view of the furnace portion shown in Fig. 2.
Figure 4:
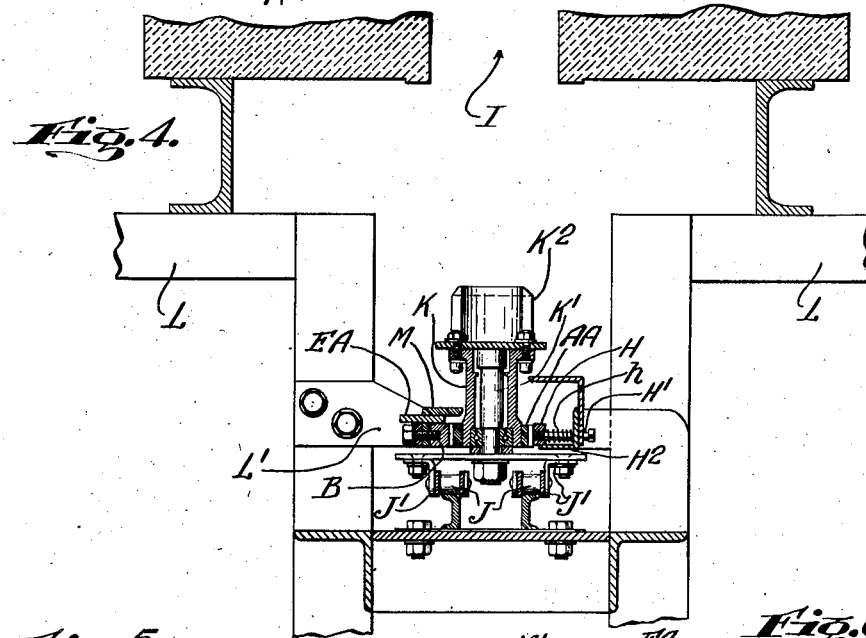
Fig. 4 is an elevation of a portion of the apparatus shown in Figs. 2 and 3, in section on the line 4—4 of Fig. 3.
Figures 5, 6:
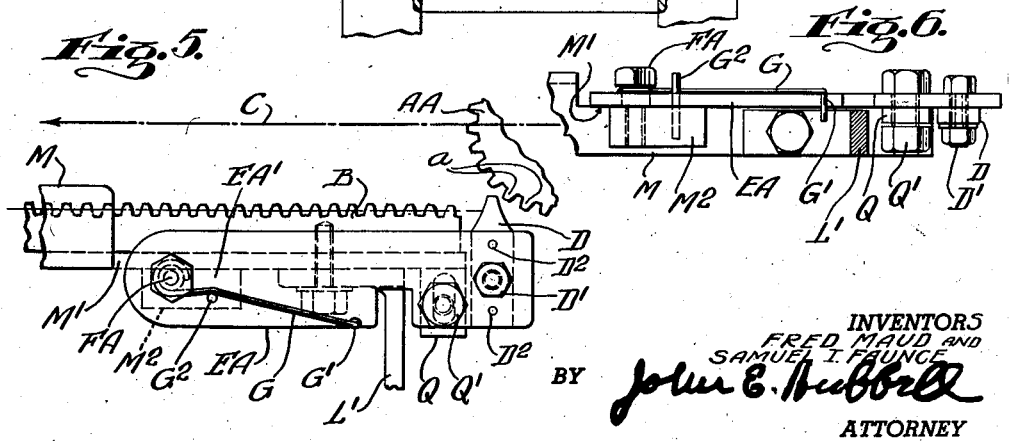
Fig. 5 is a plan view on a larger scale, of a portion of the apparatus shown in Fig. 3.
Fig. 6 is an elevation of the apparatus shown in Fig. 5.

The furnace structure includes a frame-work L located beneath the furnace chamber I and supporting driving and guide pulleys for the conveyor J. The frame-work also supports parts B, D, H, $h$, $H^1$ and $H^2$, which may be and as shown are like the parts B, D, H, $h$, $H^1$ and $H^2$ of Fig. 1. As is shown in Figs. 2, 3 and 4, the rack bar B extends longitudinally of and beneath the furnace chamber I. The bar B is connected to the frame work L by means of brackets L' and an angle bar M. The latter has a vertical flange alongside and bolted to the rack bar B, and has a horizontal flange above and forming a shroud for the subjacent rack bar teeth. The bar M is cut away at its end adjacent the forward end of the rack bar B, so that an arm EA, supporting the tooth D and generally like the arm E, may have its underside resting on and in sliding engagement with the upper sides of the rack bar and of the cut away portion M' of the angle bar M. A lug or projection $M^2$, which may be a pad welded to a cut away portion M' of the vertical flange of the angle bar M, provides an anchorage for the lower end of the vertical pivot FA for an arm EA. The latter is generally like and serves the purpose of the arm E of Fig. 1. As shown in Fig. 6, the pivot FA comprises a cylindrical portion extending through the member EA, a lower portion threaded in the lug $M^2$, and an enlarged upper hexagonal head portion. The tooth D carried by the arm EA is moved into the path of each advancing gear A by a spring like that shown in Fig. 1, and having one end coiled about the pivot pin FA, and having its other end G' in engagement with the outer edge of the member of the arm EA. The spring engaging pin $G^2$ of Figs. 2–6 has its lower end anchored in the projection $M^2$ and extends up through a slot EA' in the member EA.

As shown in Figs. 5 and 6, the bar-like body or shank portion of the tooth D is secured to the free end of the arm EA by a clamping bolt D' and pins $D^2$. A stop member Q in the form of a slotted bar is adjustably secured by a clamping bolt Q' to the under side of the arm EA between the tooth D and the adjacent end of the rack bar B. The part Q has its inner end in position to abut against the outer edge of the rack bar B and thus limit the extent to which the tooth D extends into the path of the tooth $a$ of the advancing gear A. The position of the tooth D thus depends on the adjustment of the part Q when the apparatus is in the condition shown in Fig. 5.

As will be apparent, the tooth D and friction bar H of the construction shown in Figs. 2–6, cooperate to properly mesh the teeth $a$ of the gears AA with the teeth $b$ of the rack bar B, just as the tooth D and bar H of Fig. 1 cooperate to bring the teeth of gear A into mesh with the teeth of the rack bar B of Fig. 1. The means disclosed in Figs. 2-6 for rotating the spindles K carried by the belt conveyor J, constitute simple and effective means for rotating cartridge cases and other bodies mounted on said spindles and subjected to a heat treatment by rotating them as they are passed through a furnace chamber.

The relative movement of the spur gear axis and rack bar resulting in the engagement of the spur gear and rack bar teeth, is due, in the constructions shown in the accompanying drawings, to a motion of translation of the spur gear effected while the rack bar remains stationary. As will be apparent, however, the invention may be used with similar advantage in mechanisms in which said relative movement is due solely to a motion of translation of the rack bar, or is due to a differential or translational motions of the spur gear and rack bar.

While the above-described improvement has been shown as applied to spur gears, it is to be understood that it is equally applicable to other types of gears, such as, for example, helical, beveled and spiral gears.

While in accordance with the statutes we have illustrated and described the best embodiment of our invention now known to us, those skilled in the art will understand that changes may be made in the forms of embodiment disclosed herein without departing from the spirt of the invention as set forth in the appended claims, and that in some cases certain features of the invention may sometimes be used with advantage without a corresponding use of other features.

Having now described our invention, what we claim as new and desire to secure by Letters Patent, is:

1. The combination of a toothed gear, means for rotatably supporting and also moving said gear along a path of movement, toothed means disposed adjacent to said path of movement, said toothed means having teeth adapted to be engaged by said gear for imparting rotation to the latter, and mechanism associated with said toothed means including a pivotally mounted member having a single tooth for accurately presenting said gear for engagement with said teeth when said gear is being moved along said path of movement toward said toothed means.

2. The combination of a toothed gear, means for rotatably supporting and also moving said gear along a path of movement, toothed means disposed adjacent to said path of movement, said toothed means having teeth adapted to be engaged by said gear for imparting rotation to the latter, and mechanism associated with said toothed means including structure arranged, when said gear is being moved toward said toothed means and not yet in engagement therewith, to be in the path of movement of said gear and effective immediately upon engaging said gear to compel the latter to move angularly such a distance that it will accurately present itself for engagement with said teeth.

3. The combination of a toothed gear, means for rotatably supporting and also moving said gear along a path of movement, toothed means disposed adjacent to said path of movement, said toothed means having teeth adapted to be engaged by said gear for imparting rotation to the latter, and mechanism associated with said toothed means including a first part adapted, when said gear is being moved along said path of movement toward said toothed means and not yet in engagement therewith, to impart rotating movement to said gear, and a second part operative during such rotating movement to bring said gear accurately into engagement with said toothed means.

4. The combination with a rack bar and a toothed gear which have gear teeth alternating with tooth spaces and are relatively movable along a path comprising one portion in which said gear and rack bar teeth do not engage and another portion in which they do engage, of means for angularly adjusting said gear while its teeth are out of engagement with the rack bar teeth as required to bring said gear and rack bar teeth into mesh when they engage, said means comprising an index tooth movable along a line in fixed relation to said rack bar and extending transversely of said path, and means tending to maintain said tooth in a position in which the relative movement of approach of said gear and rack bar will cause said tooth to enter a tooth space of said gear and rotate the latter.

5. The combination with a rack bar and a toothed gear which have gear teeth alternating with tooth spaces and are relatively movable along a path comprising one portion in which said gear and rack bar teeth do not engage and another portion in which they do engage, of means for angularly adjusting said gear while its teeth are out of engagement with the rack bar teeth as required to bring said gear and rack bar teeth into mesh when they engage, said means comprising an index tooth movable along a line in fixed relation to said rack bar and extending transversely of said path, means tending to maintain said tooth in a position in which the relative movement of approach of said gear and rack bar will cause said tooth to enter a tooth space of said gear and rotate the latter, and means for rotating said gear as it comes into engagement with said index tooth.

6. The combination with a stationary rack bar and a rotatable gear each having gear teeth alternating with tooth spaces of means for moving said gear along a path comprising a portion in which said gear approaches but is out of engagement with said rack bar and a following portion in which the teeth of said gear and rack bar are in engagement, and means for angularly adjusting said gear as it moves through the first mentioned portion of its path as required to bring its teeth into mesh with the rack bar teeth when said gear moves into said following portion of said path, said means comprising an index tooth movable transversely of said rack bar into a position in which the movement of said gear as it approaches said following path portion causes said tooth to be entered in a tooth space of said gear, and means for maintaining said tooth in said space, and thereby rotating said gear, until the teeth of the latter mesh with the teeth of said rack bar.

7. The combination with a stationary rack bar and a rotatable gear each having gear teeth alternating with tooth spaces of means for moving said gear along a path comprising a portion in which said gear approaches but is out of engagement with said rack bar and a following portion in which the teeth of said gear and rack bar are in engagement, and means for angularly adjusting said gear as it moves through the first mentioned portion of its path as required to bring its teeth into mesh with the rack bar teeth when said gear moves into said following portion of said path, said means comprising an index tooth movable transversely of said rack bar into a position in which the movement of said gear as it approaches said following path portion causes said tooth to be entered in a tooth space of said gear, means for maintaining said tooth in said space, and thereby rotating said gear, until the teeth of the latter mesh with the teeth of said bar, and means subjecting said gear to a yielding rotative force as it moves into engagement with said tooth.

8. The combination with a stationary rack bar and a rotatable gear each having gear teeth alternating with tooth spaces, of means for moving said gear along a path comprising a portion in which said gear approaches but is out of engagement with said rack bar and a following portion in which the teeth of said gear and rack bar are in engagement, an index tooth extending transversely to said path and displaced longitudinally of said rack bar away from the tooth of said bar first engaged by said gear as it moves into engagement with the rack bar teeth, an arm supporting said index tooth and pivoted to move said index tooth transversely of said rack bar, and a bias spring tending to maintain said index tooth in a position in which the movement of said gear, as it approaches said following path portion, will cause said tooth to be entered in a tooth space of said gear and thereafter maintaining said tooth in said space until the teeth of the latter mesh with the teeth of said rack bar.

9. The combination with a stationary rack bar and a rotatable gear each having gear teeth alternating with tooth spaces, of means for moving said gear along a path comprising a portion in which said gear approaches but is out of engagement with said rack bar and a following portion in which the teeth of said gear and rack bar are in engagement, an index tooth extending transversely to said path and displaced longitudinally of said rack bar away from the tooth of said bar first engaged by said gear as it moves into engagement with the rack bar teeth, an arm supporting said index tooth and pivoted to move said index tooth transversely of said rack bar, a bias spring tending to maintain said index tooth in a position in which the movement of said gear, as it approaches said second path portion, will cause said tooth to be entered in a tooth space of said gear and thereafter maintaining said tooth in said space until the teeth of the latter mesh with the teeth of said rack bar, and means at the opposite side of said path from said rack engaging said gear and subjecting it to a frictional retarding force which rotates said gear as the latter moves into engagement with said index tooth.

10. The combination with a stationary rack bar and a rotatable gear each having gear teeth alternating with tooth spaces, of means for moving said gear along a path comprising a portion alongside said rack bar in which the gear teeth engage the rack bar teeth, and another portion displaced from said rack bar in which the spur gear and rack bar teeth do not engage, means for angularly adjusting the gear while its teeth are out of engagement with the rack bar teeth as required to bring the gear and rack bar teeth into mesh when they engage, said means comprising an index tooth, a supporting arm for said tooth pivoted to turn about a stationary axis so disposed relative to said rack bar that movement of said arm about said axis moves said index tooth into and out of said path along a line transverse to said path and so displaced, longitudinally of the rack bar, from the first rack bar tooth which the approaching gear engages, that two or more gear tooth spaces are interposed between the two gear spaces, respectively, entered by the last mentioned tooth and by said index tooth, and positioning means for holding said index tooth in position to enter a tooth space of the gear during the movement of the gear into the position in which its teeth mesh with the rack bar teeth and for maintaining said index tooth in said tooth space and thereby rotating said gear until the teeth of the latter move into mesh with the rack bar teeth.

FRED MAUD.
SAMUEL I. FAUNCE.